United States Patent
Uchino et al.

(10) Patent No.: US 10,306,512 B2
(45) Date of Patent: May 28, 2019

(54) MOBILE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/029,270

(22) PCT Filed: Sep. 25, 2014

(86) PCT No.: PCT/JP2014/075444
§ 371 (c)(1),
(2) Date: Apr. 14, 2016

(87) PCT Pub. No.: WO2015/056542
PCT Pub. Date: Apr. 23, 2015

(65) Prior Publication Data
US 2016/0262046 A1   Sep. 8, 2016

(30) Foreign Application Priority Data
Oct. 15, 2013   (JP) .................... 2013-214935

(51) Int. Cl.
*H04W 28/02* (2009.01)
*H04W 28/08* (2009.01)
(Continued)

(52) U.S. Cl.
CPC ..... *H04W 28/0289* (2013.01); *H04L 43/0888* (2013.01); *H04L 43/16* (2013.01);
(Continued)

(58) Field of Classification Search
CPC .... H04L 43/0888; H04L 43/16; H04W 24/10; H04W 28/0289; H04W 28/08;
(Continued)

(56) References Cited

U.S. PATENT DOCUMENTS 8,774,823 B2 * 7/2014 Golaup ................ H04W 28/08
370/329
9,686,677 B2 * 6/2017 Pinheiro ............... H04W 12/04
(Continued)

FOREIGN PATENT DOCUMENTS

EP     2584837 A1    4/2013

OTHER PUBLICATIONS

Intel Corporation; "Radio link failure handling for dual connectivity"; #GPP TSG RAN WG2 Meeting #83bis, R2-133498; Ljubljana, Slovenia, Oct. 7-11, 2013 (4 pages).
(Continued)

*Primary Examiner* — Robert J Lopata
(74) *Attorney, Agent, or Firm* — Osha Liang LLP (57) ABSTRACT

A mobile station UE enables scheduling with the congestion status of each component carrier taken into consideration when performing inter-eNB CA using a cell under a radio base station eNB#1 and a cell under a radio base station eNB#2. The mobile station UE includes a transmitter 12 configured to transmit the congestion status in the radio base station eNB#2 to the radio base station eNB#1.

6 Claims, 6 Drawing Sheets

(51) Int. Cl.
  *H04W 72/12* (2009.01)
  *H04L 12/26* (2006.01)
  *H04W 24/10* (2009.01)
  *H04W 36/22* (2009.01)
  *H04W 76/27* (2018.01)
  *H04W 92/10* (2009.01)

(52) U.S. Cl.
  CPC ........... *H04W 24/10* (2013.01); *H04W 28/08* (2013.01); *H04W 36/22* (2013.01); *H04W 72/1252* (2013.01); *H04W 76/27* (2018.02); *H04W 92/10* (2013.01)

(58) Field of Classification Search
  CPC ............. H04W 36/22; H04W 72/1252; H04W 76/046; H04W 92/10
  USPC ........................................................ 370/235
  See application file for complete search history.

(56) References Cited

U.S. PATENT DOCUMENTS

| | | | |
|---|---|---|---|
| 9,763,151 B2* | 9/2017 | Kim | H04W 36/04 |
| 9,801,099 B2* | 10/2017 | Gage | H04W 36/0022 |
| 2005/0180320 A1 | 8/2005 | Yeh | |
| 2010/0046532 A1* | 2/2010 | Okita | H04L 43/0817 370/401 |
| 2010/0323633 A1* | 12/2010 | Pani | H04W 24/10 455/67.14 |
| 2011/0034196 A1* | 2/2011 | Jonishi | H04W 24/02 455/509 |
| 2011/0053598 A1* | 3/2011 | Ahluwalia | H04W 36/22 455/436 |
| 2011/0176464 A1* | 7/2011 | Warner | H04B 1/713 370/311 |
| 2011/0286391 A1 | 11/2011 | Chen et al. | |
| 2012/0190378 A1* | 7/2012 | Han | H04B 7/0639 455/452.2 |
| 2012/0258720 A1* | 10/2012 | Tinnakornsrisuphap | H04W 36/04 455/442 |
| 2012/0264475 A1* | 10/2012 | Aoyagi | H04W 48/04 455/517 |
| 2013/0170454 A1* | 7/2013 | Zhou | H04W 28/08 370/329 |
| 2013/0195042 A1* | 8/2013 | Taori | H04W 72/042 370/329 |
| 2013/0237233 A1* | 9/2013 | Radulescu | H04W 36/22 455/440 |
| 2013/0286830 A1* | 10/2013 | Xu | H04B 7/18584 370/232 |
| 2014/0269580 A1* | 9/2014 | Huang | H04W 52/146 370/329 |
| 2014/0341182 A1* | 11/2014 | Gage | H04W 12/04 370/331 |
| 2014/0362829 A1* | 12/2014 | Kazmi | H04W 36/22 370/332 |
| 2015/0023341 A1* | 1/2015 | Zhao | H04W 48/18 370/338 |
| 2015/0078168 A1* | 3/2015 | Lee | H04W 28/08 370/235 |
| 2015/0163815 A1* | 6/2015 | Lei | H04W 16/10 370/280 |
| 2015/0173100 A1* | 6/2015 | Aydin | H04W 72/0426 370/329 |
| 2015/0304933 A1* | 10/2015 | Sachs | H04W 36/22 455/440 |
| 2015/0319688 A1* | 11/2015 | Matas Sanz | H04W 52/0206 455/574 |
| 2015/0365873 A1* | 12/2015 | Hoehne | H04W 36/30 455/436 |
| 2015/0373578 A1* | 12/2015 | Lee | H04W 28/08 370/236 |
| 2015/0373584 A1* | 12/2015 | Hong | H04W 28/08 370/329 |
| 2015/0373585 A1* | 12/2015 | Lee | H04W 28/08 370/329 |
| 2016/0029265 A1* | 1/2016 | Li | H04W 36/0061 455/436 |
| 2016/0119809 A1* | 4/2016 | Lee | H04W 16/08 455/453 |
| 2016/0205685 A1* | 7/2016 | Wang | H04L 5/001 370/229 |
| 2016/0374119 A1* | 12/2016 | Choi | H04W 76/02 |
| 2017/0257869 A1* | 9/2017 | Huang | H04W 52/146 |

OTHER PUBLICATIONS

CATT; "How to transfer the SeNB configuration from SeNB to MeNB"; 3GPP TSG RAN WG2 Meeting #83bis, R2-133360; Ljubljana, Slovenia, Oct. 7-11, 2013 (3 pages).
European Search Report issued in corresponding European Application No. 14853717.8, dated Aug. 31, 2016 (10 pages).
International Search Report issued in corresponding application No. PCT/JP2014/075444 dated Dec. 9, 2014 (3 pages).
Written Opinion issued in corresponding application No. PCT/JP2014/075444 dated Dec. 9, 2014 (3 pages).
CATT, "Some consideration on functional allocation"; 3GPP TSG RAN WG2 Meeting #83bis, R2-133373; Ljubljana, Slovenia; Oct. 7-11, 2013 (4 pages).
CATT, "Signaling Flow for Main Scenarios"; 3GPP TSG RAN WG2 Meeting #83bis, R2-133372; Ljubljana, Slovenia; Oct. 7-11, 2013 (5 pages).
KDDI Corporation, "C-plane procedure for addition/removal of SCells in SeNB"; 3GPP TSG RAN WG2 Meeting #84, R2-134082; San Francisco, USA; Nov. 11-15, 2013 (3 pages).
Huawei, HiSilicon, "Throughput results for inter-frequency deployment of small cells"; 3GPP TSG-RAN WG2 Meeting 082, R2-131782; Fukuoka, Japan; May 20-24, 2013 (5 pages).
Office Action issued in corresponding European Patent Application No. 14853717.8, dated Aug. 11, 2017 (7 pages).
Office Action issued in corresponding Japanese Patent Application No. 2013-214935, dated Aug. 22, 2017 (9 pages).
Fujitsu, "Flow control and QoS-aware data forwarding", 3GPP TSG-RAN WG2 Meeting #83b, R2-133209, Ljubljana, Slovenia, Oct. 7-11, 2013 (4 pages).

* cited by examiner

MOBILE STATION

TECHNICAL FIELD

The present invention relates to a mobile station.

BACKGROUND ART

Figure 5:
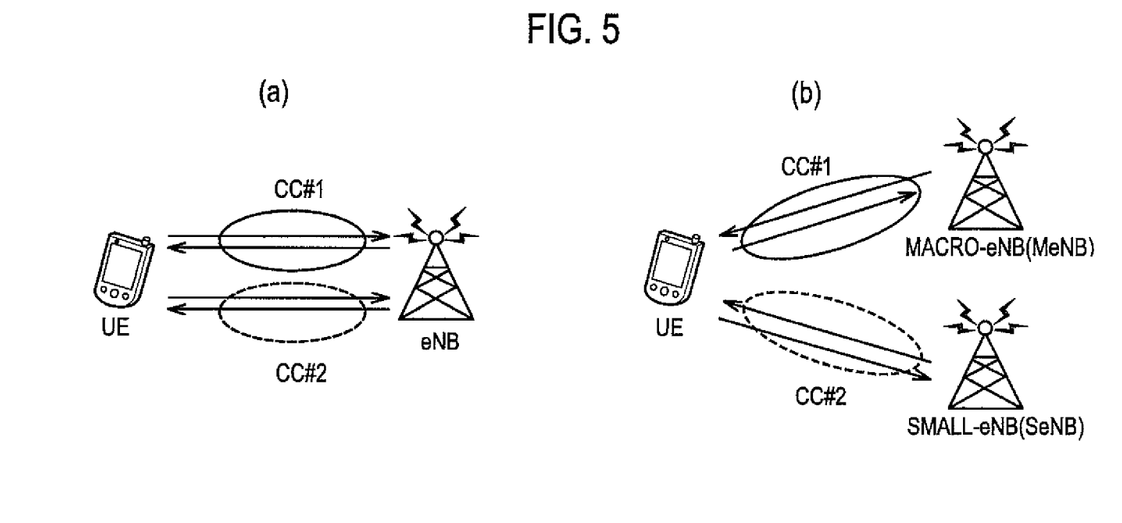

In CA (Carrier Aggregation) specified up to LTE (Long Term Evolution) Release-10, as shown in (a) of FIG. 5, communications are performed simultaneously by using CC (Component Carrier) #1 and CC#2 under the same radio base station eNB to achieve high throughput.

Meanwhile, in LTE Release-12, "inter-eNB CA (or inter-node UP aggregation)" has been considered (refer to Non-patent document 1) in which CA up to LTE Release-10 is expanded such that, as shown in (b) of FIG. 5, communications are performed simultaneously by using CC#1 and CC#2 under different radio base stations eNB#1 and eNB#2 to achieve high throughput.

The inter-eNB CA needs to be performed to achieve a degree of throughput comparable to LTE Release-10 when, for example, all CCs cannot be accommodated within one radio base station eNB.

Figure 6:
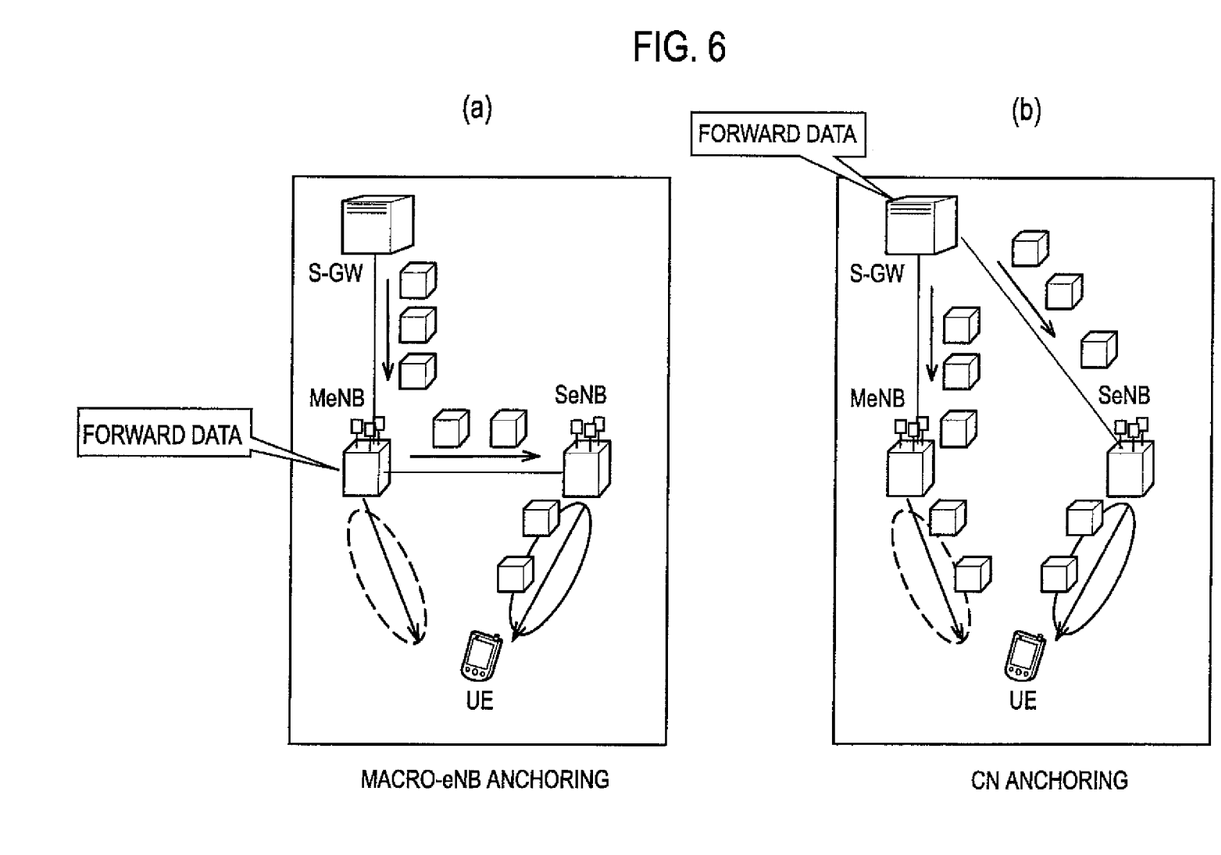

The following case is assumed where, in order to perform the inter-eNB CA, a radio base station MeNB may serve as an anchor node to forward data addressed to a mobile station UE and transmitted by a gateway apparatus S-GW to the mobile station UE or a radio base station SeNB, as shown in (a) of FIG. 6.

The following case is assumed where, the gateway apparatus S-GW may serve as an anchor node to forward data addressed to the mobile station UE to the radio base station MeNB or the radio base station SeNB, as shown in (b) of FIG. 6.

PRIOR ART DOCUMENT

Non-Patent Document

Non-patent document 1: 3GPP Contribution R2-131782

SUMMARY OF THE INVENTION

Figure 7:
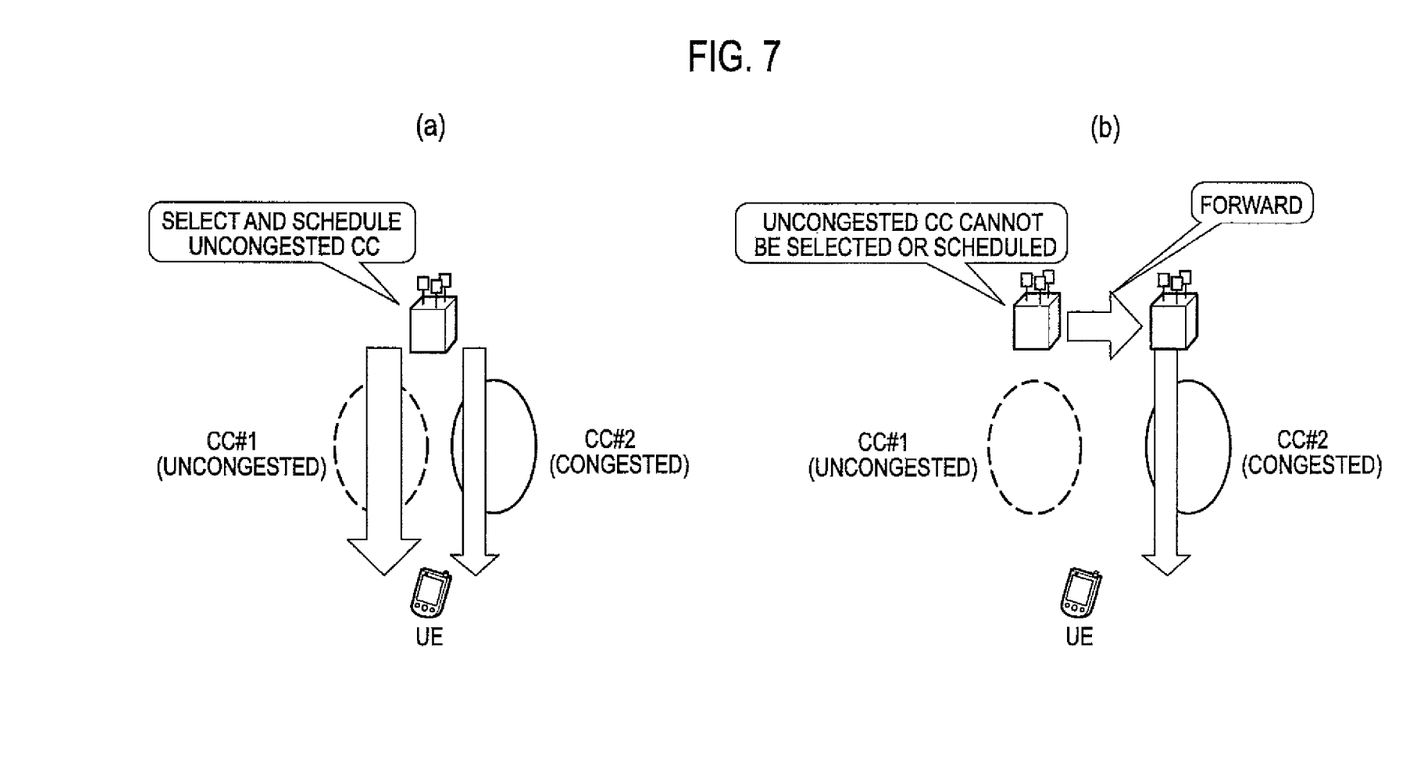

Here, in the case where intra-eNB CA is performed in the existing LTE system, the radio base station MeNB can dynamically figure out the congestion status of each CC, and thus can select the scheduling-target CC with the congestion status taken into consideration, as shown in (a) of FIG. 7.

However, there is a problem in that, in the case where the inter-eNB CA mentioned above is performed in the existing LTE system, the radio base station MeNB cannot dynamically figure out the congestion status in the radio base station SeNB, and thus cannot select an uncongested CC as the scheduling-target CC, as shown in (b) of FIG. 7.

The backhaul line between the radio base station MeNB and the radio base station SeNB is likely to be formed by a low-speed line such as ADSL instead of a high-speed line such as an optical fiber.

For this reason, if the radio base station SeNB uses the backhaul line to notify the radio base station MeNB of the congestion status in the radio base station SeNB, there has also been a problem in that the backhaul line causes a delay in the notification.

Thus, the present invention has been made in view of the above problems, and an object thereof is to provide a mobile station that enables scheduling with congestion status of each CC taken into consideration in a case of performing inter-eNB CA using a cell under a radio base station MeNB and a cell under a radio base station SeNB.

A first feature of the present invention is summarized as a mobile station configured to be capable of performing carrier aggregation using a cell under a master radio base station and a cell under a slave radio base station, including a transmitter configured to transmit a congestion status in the slave radio base station to the master radio base station.

BRIEF DESCRIPTION OF THE DRAWINGS

(a) of FIG. 5 is a view for describing carrier aggregation specified up to LTE Release-10, and (b) of FIG. 5 is a view for describing inter-eNB CA considered in LTE Release-12.

(a) of FIG. 6 is a view for describing a first case expected to occur when inter-eNB CA is performed, and (b) of FIG. 6 is a view for describing a second case expected to occur when inter-eNB CA is performed.

(a) of FIG. 7 is a view for describing a case where a scheduling-target CC can be selected with the congestion status of each CC taken into consideration, and (b) of FIG. 7 is a view for describing a case where a scheduling-target CC cannot be selected with the congestion status of each CC taken into consideration.

MODE FOR CARRYING OUT THE INVENTION (Mobile Communication System According to the First Embodiment of the Present Invention)

A mobile communication system according to a first embodiment of the present invention will be described with reference to FIGS. 1 to 4. Although the mobile communication system according to the embodiment will be described by exemplarily presenting an LTE mobile communication system, the present invention is also applicable to other mobile communication systems than LTE mobile communication systems.

Figure 1:
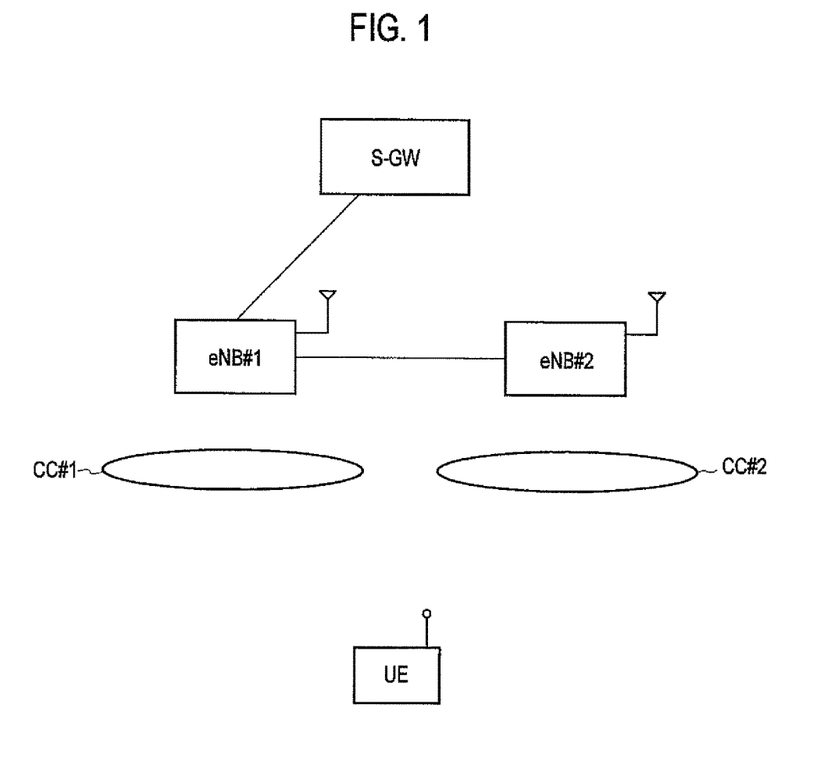
FIG. 1 is an overall configuration view of a mobile communication system according to the first embodiment of the present invention.

As shown in FIG. 1, the mobile communication system according to this embodiment includes a gateway apparatus S-GW, a radio base station eNB#1, and a radio base station eNB#2.

In the mobile communication system according to the embodiment, the radio base station eNB#1 is a master radio base station (or macro radio base station configured to manage a macrocell) MeNB. The radio base station eNB#2 is a slave radio base station (or a small radio base station configured to manage a small cell) SeNB.

Also, in the mobile communication system according to the embodiment, a mobile station UE is configured to be capable of performing inter-eNB CA using a cell under the radio base station eNB#1 and a cell under the radio base station eNB#2. Here, the CC in the cell under the radio base station eNB#1 is CC#1, and the CC in the cell under the radio base station eNB#2 is CC#2.

Further, as shown in FIG. 1, the mobile communication system according to the embodiment is configured such that data addressed to the mobile station UE and transmitted by the gateway apparatus S-GW is forwarded to the mobile station UE or the radio base station eNB#2 by the radio base station eNB#1, which serves as an anchor node.

Figure 2:
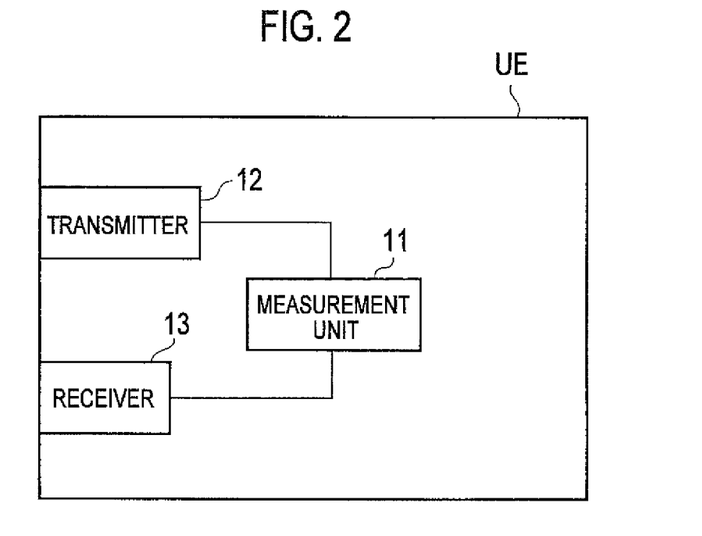
FIG. 2 is a functional block diagram of a mobile station UE according to the first embodiment of the present invention.

As shown in FIG. 2, the mobile station UE according to the embodiment includes a measurement unit 11, a transmitter 12, and a receiver 13.

The measurement unit 11 is configured to measure the throughput in a downlink from the radio base station eNB#2, the throughput in an uplink to the radio base station eNB#2, and the like.

The transmitter 12 is configured to transmit various signals to the radio base station eNB#1 and the radio base station eNB#2. The receiver 13 is configured to receive various signals from the radio base station MeNB#1 and the radio base station SeNB#2.

Also, the transmitter 12 is configured to transmit the congestion status in the radio base station eNB#2 to the radio base station eNB#1.

Here, the transmitter 12 may be configured to report congestion status to the radio base station eNB#1 that the radio base station eNB#2 is congested in the case where at least one of the throughput of the mobile station UE in the downlink or the throughput of the mobile station UE in the uplink is less than a predetermined threshold.

Further, the transmitter 12 may be configured to report congestion status to the radio base station eNB#1 that the radio base station eNB#2 is congested in the case where the throughput of the mobile station UE in the downlink is less than a predetermined threshold, and report congestion status to the radio base station eNB#1 that the radio base station eNB#2 is congested in the case where the throughput of the mobile station UE in the uplink is less than a predetermined threshold.

That is, the transmitter 12 may be configured to report as mentioned above individually for the downlink and the uplink.

In this case, the predetermined threshold compared to the throughput in the downlink and the predetermined threshold compared to the throughput in the uplink may be the same value or different values.

Alternatively, the transmitter 12 may be configured to report congestion status to the radio base station eNB#1 that the radio base station eNB#2 is congested in the case where the throughput of the mobile station UE in both of the uplink and the downlink in either of the CC#1 and CC#2 is less than a predetermined value.

That is, the transmitter 12 may be configured to determine for each of the CC#1 and CC#2 whether or not the throughput of the mobile station UE in both of the uplink and the downlink is less than a predetermined threshold, and report congestion status to the radio base station eNB#1 that the radio base station eNB#2 is congested in the case where the throughputs are less than the predetermined thresholds.

In this case, the transmitter 12 may be configured to report the index of the CC with throughput less than the predetermined threshold, in addition to the congestion status.

Also, the predetermined thresholds compared to the throughputs may be the same value or different values between the CCs.

Further, the transmitter 12 may be configured to report congestion status to the radio base station eNB#1 that the radio base station eNB#2 is congested in the case where at least one of the throughput of the mobile station UE in the downlink or the throughput of the mobile station UE in the uplink is less than its predetermined threshold for a predetermined length of time.

In this case, the transmitter 12 may be configured to determine whether or not at least one of the two throughputs is less than its predetermined threshold for the predetermined length of time by setting the number of protection stages or a hysteresis.

Also, the transmitter 12 may be configured to determine the predetermined threshold(s) based on at least one of quality information on the cell under the radio base station eNB#2, setting information on the cell, or QoS of data transmitted in the cell.

Specifically, the transmitter 12 may be configured to calculate an expected throughput(s) based on the quality information on the cell under the radio base station eNB#2, the setting information on the cell, or the like, and set the value of the calculated throughput as the predetermined threshold (s).

Here, as the above quality information, CQI (Channel Quality Indicator), RSRP (Reference Signal Received Power), RSRQ (Reference Signal Received Quality), or the like may be used.

The transmitter 12 may be configured to report as mentioned above for each CC or to report as mentioned above based on the average of the throughputs in the plurality of CCs in the case of performing intra-eNB CA in the radio base station eNB#2 (radio base station SeNB).

As the above setting information, the number of CCs set in the cell mentioned above, the number of MIMO (Multi Input Multi Output) layers, or the like may be used.

Note that the predetermined threshold(s) may be notified by the radio base station eNB#1 (or radio base station eNB#2).

The transmitter 12 may be configured to report congestion status to the radio base station eNB#1 that the radio base station eNB#2 is congested in the case where the number or total size of packets (RLC-SDU/PDCP-SDU) discarded during a predetermined period of time in a bearer (or logical channel) set in the radio base station eNB#2 is greater than a predetermined threshold.

The transmitter 12 may be configured to report congestion status to the radio base station eNB#1 that the radio base station eNB#2 is congested in the case where the number of times allocation is performed within a predetermined period of time is less than a predetermined threshold during a period in which data is present in a buffer in the bearer (or logical channel) set in the radio base station eNB#2.

Figure 3:
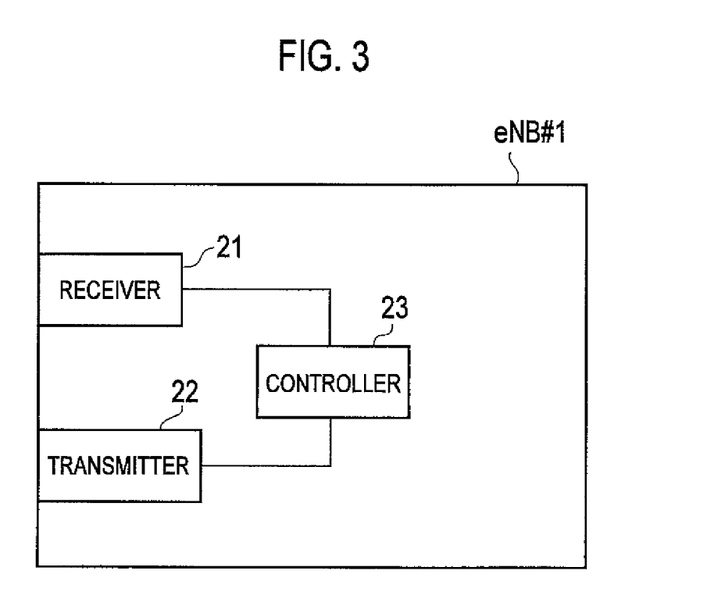
FIG. 3 is a functional block diagram of a radio base station eNB#1 according to the first embodiment of the present invention.

As shown in FIG. 3, the radio base station eNB#1 according to the embodiment includes a receiver 21, a transmitter 22, and a controller 23.

The receiver 21 is configured to receive various signals from the mobile station UE and the radio base station eNB#2. The transmitter 22 is configured to transmit various signals to the mobile station UE and the radio base station eNB#2. The controller 23 is configured to perform control related to communication with the mobile station UE (e.g. control related to the inter-eNB CA mentioned above).

In the case where the receiver 21 receives the congestion status from the mobile station UE, the controller 23 may be configured to stop the inter-eNB CA or change the slave radio base station SeNB from the radio base station eNB#2 to another radio base station eNB based on the received congestion status.

Also, the transmitter 22 may be configured to transmit the predetermined threshold(s) to the mobile station UE.

The operation of the radio base station eNB#1 in the mobile communication system according to the embodiment will be described below with reference to FIG. 4.

Figure 4:
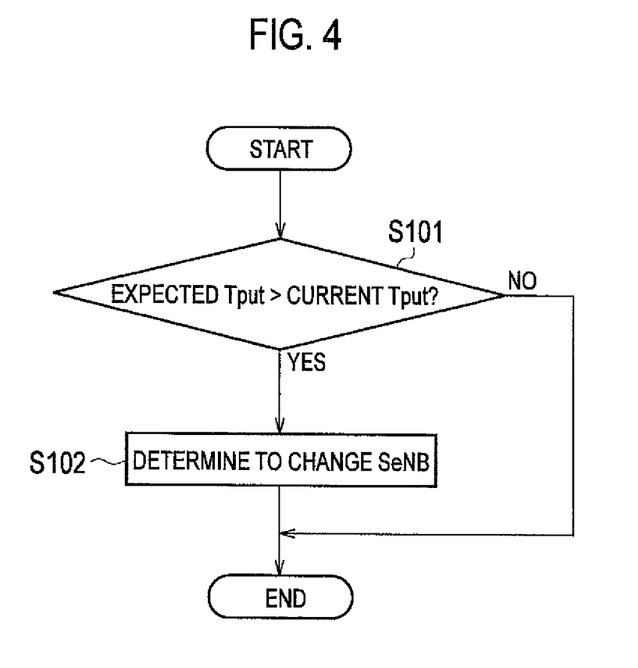
FIG. 4 is a flowchart showing the operation of the radio base station eNB#1 according to the first embodiment of the present invention.

As shown in FIG. 4, in step S101, the radio base station eNB#1 determines whether or not the throughput(s) (Tput) notified by means of the congestion status received from the mobile station UE is less than the predetermined threshold (s) (the value(s) of the throughput(s) expected by the mobile station UE).

If "Yes," this operation proceeds to step S102. If "No," this operation ends.

In step S102, the radio base station eNB#1 changes the slave radio base station SeNB (radio base station eNB#2).

The features of the embodiment as described above may also be expressed as follows.

The first feature of the embodiment is as follows.

A mobile station UE is configured to be capable of performing CA (carrier aggregation) using a cell under a radio base station eNB#1 (master radio base station) and a cell under a radio base station eNB#2 (slave radio base station). Here, the mobile station UE includes a transmitter 12 configured to transmit a congestion status in the radio base station eNB#2 to the radio base station eNB#1.

According to the first feature, the radio base station eNB#1 can perform scheduling with the congestion status of each CC taken into consideration in the case where the mobile station UE performs inter-eNB CA using the cell under the radio base station MeNB and the cell under the radio base station SeNB.

Note that the congestion status may be stored in any signal in the RRC layer. For example, the congestion status may be reported as a dummy "measurement report" with which the quality in the cell under the radio base station eNB#2 is assumed to have been lowered significantly.

In the first feature of the embodiment, the transmitter 12 may report congestion status to the radio base station eNB#1 that the radio base station eNB#2 is congested in the case where at least one of a throughput of the mobile station UE in a downlink or a throughput of the mobile station UE in an uplink is less than a predetermined threshold.

According to this configuration, the radio base station eNB#2 is determined to be congested in the case where at least one of the throughput of the mobile station UE in the downlink or the throughput of the mobile station UE in the uplink is less than the predetermined threshold. In this way, it is possible to quickly detect the occurrence of congestion in the radio base station eNB#2.

In the first feature of the embodiment, the transmitter 12 may report congestion status to the radio base station eNB#1 that the radio base station eNB#2 is congested in the case where the throughput of the mobile station UE in the downlink is less than the predetermined threshold, and the transmitter 12 may report congestion status to the radio base station eNB#1 that the radio base station eNB#2 is congested in the case where the throughput of the mobile station UE in the uplink is less than the predetermined threshold.

According to this configuration, congestion in the radio base station eNB#2 is reported individually for the downlink and the uplink. In this way, it is possible to perform scheduling with the congestion status taken into consideration independently for the downlink and the uplink.

In the first feature of the embodiment, the transmitter 12 may report congestion status to the radio base station eNB#1 that the radio base station eNB#2 is congested in the case where the throughput of the mobile station UE in each of the uplink and the downlink in each of CCs is less than the predetermined threshold.

According to this configuration, congestion in the radio base station eNB#2 is reported individually for each CC. In this way, it is possible to perform scheduling with the congestion status taken into consideration independently for each CC.

In the first feature of the embodiment, the transmitter 12 may report congestion status to the radio base station eNB#1 that the radio base station eNB#2 is congested in the case where at least one of the throughput of the mobile station UE in the downlink or the throughput of the mobile station UE in the uplink is less than the predetermined threshold for a predetermined length of time.

According to this configuration, the mobile station UE can avoid reporting that the radio base station eNB#2 is congested in the case where the throughput(s) decreases only instantaneously.

In the first feature of the embodiment, the transmitter 12 may determine the predetermined threshold based on at least one of quality information on the cell under the radio base station eNB#2, setting information on the cell, or QoS of data transmitted in the cell.

According to this configuration, the predetermined threshold can be determined with the conditions of the cell under the radio base station eNB#2 taken into consideration.

In the first feature of the embodiment, the predetermined threshold may be notified of by the radio base station eNB#1. That is, in the first feature of the embodiment, the receiver 13 of the mobile station UE may be configured to receive the predetermined threshold transmitted by the transmitter 22 of the radio base station eNB#1 to be notified to the mobile station UE.

According to this configuration, the predetermined threshold can be determined based on the operator's policy.

Note that the foregoing operations of the radio base stations eNB#1/eNB#2 and the mobile station UE may be implemented by hardware, may be implemented by a software module executed by a processor, or may be implemented in combination of the hardware and software.

The software module may be provided on a storage medium in any format, such as RAM (Random Access Memory), flash memory, ROM (Read Only Memory), EPROM (Erasable Programmable ROM), EEPROM (Electronically Erasable and Programmable ROM), a register, a hard disk, a removable disk, or CD-ROM.

The storage medium is connected to a processor so that the processor can read and write information from and to the storage medium. Alternatively, the storage medium may be integrated in a processor. The storage medium and the processor may be provided inside an ASIC. Such an ASIC may be provided in the radio base stations eNB#1/eNB#2 and the mobile station UE. Otherwise, the storage medium and the processor may be provided as discrete components inside the radio base stations eNB#1/eNB#2 and the mobile station UE.

Previously, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which is determined by the description of the scope of claims. Therefore, the description of the specification is intended for illustrative explanation only and does not impose any limited interpretation on the present invention.

Note that the entire content of Japanese Patent Application No. 2013-214935 (filed on Oct. 15, 2013) is incorporated by reference in the present specification.

INDUSTRIAL APPLICABILITY

The present invention is applicable to cases where a mobile station is subjected to scheduling with the congestion status of each CC taken into consideration when performing inter-eNB CA.

EXPLANATION OF THE REFERENCE NUMERALS

S-GW gateway apparatus
UE mobile station
eNB#1/eNB#2 radio base station
11 measurement unit
12, 22 transmitter
13, 21 receiver
23 controller

The invention claimed is:

1. A mobile station comprising:
a transmitter that communicates with a master radio base station and a slave radio base station simultaneously using carrier aggregation in a Long Term Evolution (LTE) system; and
a processor that determines that at least one of a first throughput and a second throughput is less than a predetermined threshold,
wherein the first throughput is a throughput between the slave radio base station and the mobile station in a downlink,
wherein the second throughput is a throughput between the slave radio base station and the mobile station in an uplink, and
wherein the transmitter transmits, to the master radio base station, a congestion status that indicates the slave radio base station is congested, based on the determination, using a signal in a Radio Resource Control (RRC) layer.

2. The mobile station according to claim 1, wherein
the transmitter transmits the congestion status based on the processor determining that the first throughput is less than the predetermined threshold, and
the transmitter transmits the congestion status based on the processor determining that the second throughput is less than the predetermined threshold.

3. The mobile station according to claim 1, wherein the processor determines that at least one of the first throughput in each of component carriers and the second throughput in each of the component carriers is less than a predetermined threshold.

4. The mobile station according to claim 1, wherein the processor determines that at least one of the first throughput and the second throughput is less than a predetermined threshold for a predetermined length of time.

5. The mobile station according to claim 1, wherein the processor determines the predetermined threshold based on at least one of quality information on the slave radio base station, setting information on a second cell, or Quality of Service (QoS) of data transmitted in the second cell.

6. The mobile station according to claim 1, further comprising a receiver that receives the predetermined threshold transmitted by the master radio base station.

* * * * *